United States Patent [19]

Rampl

[11] Patent Number: 4,739,811

[45] Date of Patent: * Apr. 26, 1988

[54] PNEUMATIC VEHICLE TIRE WITH RADIAL PLY CARCASS AND TREAD MEMBER COMPOSED OF A BASE LAYER SITUATED CLOSER TO THE TIRE AXIS AND A CAP LAYER ARRANGED ON TOP THEREOF

[75] Inventor: Alfred Rampl, Günselsdorf, Austria

[73] Assignee: Semperit Reifen Aktiengesellschaft, Vienna, Austria

[*] Notice: The portion of the term of this patent subsequent to Apr. 8, 2003 has been disclaimed.

[21] Appl. No.: 820,652

[22] Filed: Nov. 21, 1986

Related U.S. Application Data

[63] Continuation of Ser. No. 539,095, Oct. 5, 1983, Pat. No. 4,580,608.

[30] Foreign Application Priority Data

Oct. 20, 1982 [AT] Austria .................................. 3851/82

[51] Int. Cl.⁴ ........................ B60C 11/01; B60C 13/00
[52] U.S. Cl. .................................. 152/209 R; 152/525
[58] Field of Search .................. 152/209 R, 525, 454, 152/532

[56] References Cited

U.S. PATENT DOCUMENTS

| | | | |
|---|---|---|---|
| 2,224,141 | 12/1940 | Clark | 152/532 X |
| 3,019,148 | 1/1962 | Hausch | 152/209 R |
| 3,364,965 | 1/1968 | Oubridge | 152/209 R |
| 3,853,164 | 12/1974 | Mirtain | 152/209 R |
| 4,152,186 | 5/1979 | Shibata | 152/209 R |
| 4,280,543 | 7/1981 | Bond et al. | 152/209 R |
| 4,319,620 | 3/1982 | Knill | 152/209 R |
| 4,385,653 | 5/1983 | Okazaki et al. | 152/209 R |
| 4,580,608 | 4/1986 | Rampl | 152/209 R |

FOREIGN PATENT DOCUMENTS

| | | | |
|---|---|---|---|
| 3045765 | 6/1981 | Fed. Rep. of Germany. | |
| 56-79004 | 6/1981 | Japan | 152/209 R |
| 56-146405 | 11/1981 | Japan | 152/209 R |

Primary Examiner—Jerome Massie, IV
Assistant Examiner—Ramon R. Hoch
Attorney, Agent, or Firm—Werner W. Kleeman

[57] ABSTRACT

The pneumatic vehicle tire comprises a radial ply carcass, two side walls, a tread member and a belt or breaker comprising at least one cord layer. The tread member is composed of a base layer positioned closer to the tire axis and a cap layer arranged on top thereof. For particularly favorably affecting the rolling behavior of the tire the base layer forms a trough in which the cap layer is accommodated.

20 Claims, 6 Drawing Sheets

PNEUMATIC VEHICLE TIRE WITH RADIAL PLY CARCASS AND TREAD MEMBER COMPOSED OF A BASE LAYER SITUATED CLOSER TO THE TIRE AXIS AND A CAP LAYER ARRANGED ON TOP THEREOF

CROSS-REFERENCE TO RELATED APPLICATION

This application is a continuation of my commonly assigned, United States application Ser. No. 06/539,095, filed on Oct. 5, 1983 and entitled: "Pneumatic Vehicle Tire with Radial Ply Carcass and Tread Member Composed of a Base Layer Closer to the Tire Axis and a Cap Layer Arranged on top thereof", now U.S. Pat. No. 4,580,608, granted Apr. 8, 1986.

BACKGROUND OF THE INVENTION

The present invention relates to a new and improved pneumatic vehicle tire.

The present invention relates more specifically to a new and improved pneumatic vehicle tire comprising a radial ply carcass, two side walls each lining or covering a respective lateral region of the carcass, a tread member covering an apex or crown region of the carcass, and a belt comprising at least one rubberized cord ply embedded between the tread member and the apex or crown region of the carcass. The tread member comprises a base layer positioned closer to the tire axis i.e. the axis of rotation of the tire and a cap layer arranged on top thereof.

Such structure substantially corresponds to a conventional tire having a tread member which is "doubled", i.e. composed of two layers. A number of different patents have been published with respect to such type tread members.

A tire as known, for example, from U.S. Pat. No. 3,157,218, granted Nov. 17, 1964, comprises a tread member having a base layer which prevents, due to its chemical-physical properties, too great heat build-up caused by the expanding and compressing or so-to-speak pumping movement of the tire during use. Such construction is known in a somewhat modified form in diagonal ply tires, however, is selected there for reasons of the technological process. In the one-step construction of diagonal ply tires, the side walls comprising a single semi-finished material can be applied to the non-crowned carcass and only thereupon is there prepared the actual tread surface. Thus, the portion of the semi-finished material forming the side walls is positioned below the actual tread surface, and thus, is located in the position of a base layer.

A pneumatic tire as described, for example, in U.S. Pat. No. 3,931,844, granted Jan. 13, 1976, comprises a cushion-like support under the tread member. This support is more supple or softer than the rubber mixture of the actual tread member and which extends over the tire width. In the region of the equatorial plane of the tire the support has its greatest thickness and has, however, only a very small thickness in the region of the tire shoulders. By virtue of such a structure a uniform tire wear and an improved traction are intended to be achieved.

In another tire construction as described, for example, in German Pat. Publication No. 3,008,713, published Sept. 24, 1981, a plate is arranged between the belt and the actual tread member. The plate has a Shore hardness in the range of about 40 to 50 and a resilience or rebound elasticity in the range of about 60 to 70 and it possesses a width which corresponds to about 60 to 70 percent of the width of the belt. It is the object of this tire structure to reduce the rolling resistance and the heat build-up.

A tire as described, for example, in German Patent Publication No. 3,046,716, published Sept. 17, 1981, comprises a tread member composed of an inner and outer ply which have different hysteresis loss indices. Also in this case the object is to reduce the rolling resistance of the tire and thereby the energy loss. At the same time a distinct geometrical configuration is described in this publication.

A tread member subdivided in the same way and as described, for example, in German Pat. Publication No. 3,045,765, published June 11, 1981, has a base layer which is designated as a dampening caoutchouc layer. This layer has an elasticity loss modulus in the range of 2 to 12 $kg/cm^2$ and a resilience or rebound elasticity in the range of 60 to 85 percent. Also this construction is concerned with the improvement of the rolling properties just as in German Pat. Publication No. 3,002,360.

In the tire as known, for example, in such German Pat. Publication No. 3,002,360 a base layer and a cap layer are described which have different values of the resilience or rebound elasticity for improving the rolling properties of the tire.

It is furthermore known in radial ply tires for trucks to arrange a covering layer of highly dampening rubber, which covering layer is termed "tire buffer". Frequently, this tire buffer comprises only two bands or strips which are arranged to extend over the belt edges, and thus, have a belt edge protecting function. Rubber mixtures suited therefor have a very small hardness like, for example, a Shore A hardness of 50 and also have a very small stress value like, for example, $\sigma 150 = 1$ MPa. Such "poor" properties are required for the function as a tire buffer and do not negatively affect the properties of the tread member due to the small thickness thereof which is, for example, in the range of 2 to 4 millimeters. Such rubber mixtures or formulations for tire buffers would be unsuited for base layers.

It is substantially the object of the known tire constructions to maintain the rolling resistance, and thus, the energy loss at the smallest possible value and to also prevent excessive heat generation during use. This object is partially satisfied by the tire constructions as mentioned hereinbefore. However, it has been found that the intended reduction in the rolling resistance is not satisfactorily obtained with the known constructions when the tire is driven through curves. The effect is particularly negative also for the reason that radial ply tires have their highest bearing pressure in the region of the shoulders and that the highest contributions to the reduction in the rolling resistance can be achieved in these very locations.

SUMMARY OF THE INVENTION

Therefore, with the foregoing in mind it is a primary object of the present invention to provide a new and improved pneumatic vehicle tire having a radial ply carcass and a tread member subdivided into a base layer and a cap layer, in which the function and the properties of the rubber mixture which forms the base layer more favorably affect the properties and particularly the rolling behavior of the tire than in all heretofore proposed constructions of tires.

Another important object of the present invention is directed to the provision of a new and improved pneumatic vehicle tire in which the aforementioned properties, particularly the rolling properties of the tire, are improved specifically in the shoulder region.

Now in order to implement these and still further objects of the invention, which will become more readily apparent as the description proceeds, the tire of the present development is manifested by the feature that, the base layer forms a trough accommodating the cap layer. Due to this novel construction of a tread member composed of a base layer and a cap layer, a largest possible proportion of the volume of the tread member is allocated to the base layer, whereby also the qualitative properties of the base layer become quantitatively effective to the largest extent. This is of very great significance particularly in the shoulder region of the tire, since this region is subject to the most multifarious stresses, for example, during driving through curves. Additionally, the tire of the present development is manifested by the features that, this region is substantially defined by the shoulders of the trough. The term "trough" as used in the present description of the invention, generally designates any arrangement of a base layer in which projections directed towards the external side of the tire protrude from a substantially planar layer in the shoulder region.

The aforementioned properties which are influenced by the base layer do not automatically exclusively affect the reduction in the energy loss during the rolling movement of the tire, but additional objects may also be imposed upon the combination of the base layer and the cap layer as will be described in more detail hereinbelow.

Starting from the aforementioned trough-like construction there are now provided the most different developmental designs or embodiments of the present invention which meet the most different requirements and which are adapted to the desired related properties of the tire or, respectively, to the different possibilities of manufacturing the tire.

To distinctly bring out the intended effects it is advantageous when, in the pneumatic vehicle tire according to the invention, the proportion of the cross-section of the base layer in the total cross-section of the tread member amounts to at least 30 percent, preferably to at least 40 percent.

In a further design of the tire according to the invention the trough shoulders in the base layer are constituted by a plurality of members, preferably two members. As already explained, the shoulder regions of the tire are subject to higher mechanical stresses as compared to other regions of the tread member during the rolling movement of a tire. By the two-part subdivision of the base layer in this region it is possible to optimally counteract the most different ones of such stresses. Thus it is contemplated, for example, that the portions of the trough shoulders which are most distant or remote from the circumferential equatorial plane be composed of a rubber mixture or formulation which is very similar or may even be identical to the rubber mixture of the side walls. In such a design of the tire according to the invention there is obtained, in addition to the advantages of the trough-shaped base layer, the so-called manufacturing method of "side walls-over-tread member" which is known as such in terms of its construction. The tread member is thus more solidly bonded to the side walls. Furthermore, detachment of the tread member can hardly here occur, since the tire according to the invention is devoid of the butt joint between the tread member and the side walls which is open to the exterior and which is obtained by other manufacturing methods because, in the inventive tire the side wall which is optimally bonded to the rubber mixture of the trough shoulders overlaps the tread member.

In accordance with a further development of the tire according to the invention, the base layer comprises a rubber mixture having a Shore A hardness in the range of 60 to 80 as determined according to German Industrial Standard 53505 or Austrian Industrial Standard C9432. Furthermore, the rubber mixture forming the base layer has a $\sigma$ 150 stress value in the range of 4 to 9 MPa as determined in accordance with German Industrial Standard 53504 or Austrian Industrial Standard C9431. Contrary thereto, the cap layer comprises a relatively supple or soft rubber mixture having a Shore A hardness in the range of 55 to 75 and a $\sigma$ 150 stress value in the range of 2 to 6 MPa. The Shore A hardness of the rubber mixture for the base layer is greater by at least 3 units than that of the rubber mixture forming the cap layer. Such a design of the pneumatic vehicle tire produces rather good handling properties, since the rubber mixture forming the base layer is harder and simultaneously more elastic, while the rubber mixture forming the cap layer is somewhat more supple or softer, and thus, has better traction properties. Consequently, the tire responds more precisely to steering pulses or maneuvers.

In accordance with a further design of the tire according to the invention the base layer comprises a rubber mixture or formulation having a Shore A hardness in the range of 50 to 70, while the cap layer comprises a relatively harder rubber mixture having a Shore A hardness in the range of 60 to 80, the hardness of the rubber mixture forming the cap layer being greater by at least 3 units than that of the rubber mixture forming the base layer.

While a similar structure is already known from the aforementioned U.S. Pat. No. 3,931,844, however, in such known structure the more supple or softer base layer which is concentrated in the range or region of the equatorial plane of the tire is intended to generate uniform wear and, additionally, to improve upon the traction properties. In the present design of the tire according to the invention, with the tread member structure as described hereinbefore, the more supple or softer, trough-shaped base layer, contrary thereto, acts to provide for a slightly delayed handling which, while forming some disadvantage for high-speed driving, on the other hand enables achieving a smooth driving behavior with greater driving comfort similar to that obtained with a diagonal ply tire which, in turn, is desired for certain purposes of use. Additionally, a noise-reducing effect is produced by the more supple or softer base layer, since the shocks exerted by the roadway on the tire are attenuated or dampened.

In addition there results an advantageous braking behavior in that the base layer which transmits the braking forces from the carcass to the harder cap layer, has a slight delaying action.

The values for the rolling resistance and, particularly, also the traction properties are particularly favorable in the tire according to the invention when, in a further development thereof, the base layer has a tangent $\delta$ value which is smaller than 0.1 and, preferably, in the range of 0.03 to 0.08 at a temperature of 100° C., while the cap layer has a tangent δ value greater than 0.1, preferably in the range of 0.14 to 0.20. The determination of the tangent δ value is performed using an "ELASTODYN" apparatus of the Göttfert type in accordance with German Industrial Standard 53513; therein tangent δ designates the ratio of the loss modulus E" over the storage modulus E' as in the equation:

$$\tan \delta = \frac{E''}{E'}.$$

In parallel therewith there also occurs a smaller temperature rise in the interior of the tread member during use of the tire.

In accordance with a further development of the tire according to the invention, the rubber mixture forming the cap layer corresponds to a conventional tread mixture while the rubber mixture forming the base layer, however, is less resistant to wear and ozone and constituted by raw materials like, for example, tire reclaims and the like which are more favorable with respect to costs. The σ 150 stress value and the Shore hardness of the rubber mixture forming the base layer are at least equal to the σ 150 stress value and the Shore hardness of the mixture forming the cap layer, preferably, however, are greater than those. Such a construction enables reducing the costs of the tire without reducing the functional capability thereof.

For the same reason a further development of the tire according to the invention has been devised in which the mixture forming the base layer in principle is composed of the same main constituents as the mixture forming the cap layer, however, there are not provided, in the mixture forming the base layer, specific traction improving components as well as aging protective agents. In modern tire technology particularly mixture components for traction improvement comprise highly valuable and expensive raw materials which, like the protective agents against ozone and UV-radiation, should be used only in those portions of the tire which are located at the outer surface thereof.

In another development of the inventive tire the mixture forming the base layer comprises the same main constituents as the press-on mixture, i.e. the cord-embedding mixture which coats or into which there are embedded the individual cord layers, for the belt wherein, however, there has not been added thereto for reasons of costs, an adhesive system for improving the adhesion to cord. This construction is of great advantage particularly for tires which are subjected to extremely great expanding and compressing or pumping stresses, since due to the mixture forming the base layer an optimum bond is formed between the mixture forming the cap layer and the press-on mixture for the belt. The vulcanization between the tread member and the belt can thus be obtained in the best way. Even when exposed to extremely great stresses a detachment of the tread member is thus prevented.

By the aforementioned design of the tire according to the invention there is also prevented that essential constituents of the press-on mixture for the belt like, for example, sulphur and accelerators may diffuse out to the exterior prior to the vulcanization in a manner which impairs the adhesion between the press-on mixture for the belt and the steel cord. This is achieved because there is no concentration gradient between the press-on mixture for the belt and the mixture forming the base layer with respect to the aforementioned components.

A further object is achieved by the base layer in the inventive tire when the mixture forming the base layer as well as the mixture forming the cap layer are each composed of a highly elastic caoutchouc mixture and when, however, production reclaims are added in small proportions to the mixture forming the base layer. An economically advantageous possibility for recycling is thus obtained.

In a different design of the tire according to the invention, the mixture forming the cap layer is composed of a conventional tread mixture while the mixture forming the base layer comprises a specific anti-skid caoutchouc mixture, and a portion of the tire shoulders which contacts the road is formed by the mixture forming the base layer.

Particularly during driving in curves the tires are very highly stressed in the shoulder region and therefore a specifically high skid safety is required for curve driving for some types of tires. Due to the present design of the tire according to the invention there is thus now obtained a tire having a particularly high anti-skid protection during curve driving. For tires which are specifically stressed by curve driving, a similar design is provided for the tread member in that a portion of the tire shoulders which contact the road is formed by the mixture forming the base layer, and this mixture forming the base layer comprises a particularly wear-resistant caoutchouc or rubber mixture.

A further problem in the use of tires arises due to the damage of the tires by the penetration of hard particles or objects like, for example, pointed stones or the like. To counteract this condition, a further specific development of the tire according to the invention comprises a mixture forming the base layer having a penetration energy of at least 90 mJ which is greater than the penetration energy of the mixture forming the cap layer by at least 10 percent. Consequently, any stone penetrating into the tire generally does not migrate through the mixture forming the base layer, and thus, cannot advance through the tread member into the belt layer, as occasionally occurs.

For determining the penetration energy a steel needle of defined diameter and having a parabolically-shaped tip is used. The penetration operation is conducted at a constant advancement rate of the steel needle and a force-strain-diagram is recorded. The occurrence of a rupturing event below the tip of the needle is expressed by a discontinuity in the course or run of the curve. The deformation energy E applied up to this point is determined according to the equation:

$$E_e = \int_0^{S_e} F \cdot ds$$

and is given in mJ. In this equation F represents the penetration force measured in N, s the penetration depth measured in mm and the index e the occurrence of a rupture.

The following design of the tire according to the invention provides for a facilitation in manufacture and, at the same time, for advantageous rolling properties; according thereto, the mixture forming the base layer is composed of the same constituents as the mixture forming the side walls. It is of advantage for reasons of cost if such a mixture forming the base layer is devoid of some mixture additives specific for the side walls like, for example, additives for increasing the tear resistance, for stabilization towards ozone and the like. Such particular components are not necessary below the cap layer, since in this case the base layer is completely covered.

The invention is not only concerned with the aforementioned aspects of the tire structure, but also relates to novel methods of producing the same. Generally speaking, the inventive method relates to manufacturing a pneumatic vehicle tire comprising a radial ply carcass, two side walls each lining a lateral region of the carcass, a tread member covering an apex or crown region of the carcass and composed of a base layer formed by a mixture and positioned closer to the carcass axis and a cap layer accommodated in a trough defined by shoulders and formed on the top side of the base layer, and a belt containing at least one rubberized cord ply embedded between the tread member and the apex or crown region of the carcass.

To achieve the aforementioned measures, the inventive method of manufacturing a pneumatic vehicle tire, in its more specific aspects, comprises pulling or extending each one of the two side walls over a respective one of the trough shoulders so as to totally cover the mixture forming the base layer.

Such method essentially corresponds to the method conventionally used for the manufacture of a pneumatic tire according to the "side wall-over-tread member" method. The advantage with reference to the present invention above all resides in the fact that the mixture forming the base layer does not require many of the expensive constituents which are normally present in a tread member mixture to stabilize the same against environmental effects.

In accordance with another inventive method of manufacturing a pneumatic vehicle tire it is contemplated to simultaneously extrude the mixture forming the base layer and the mixture forming the cap layer and subsequently bonding the mixtures to each other in the still warm or heated state thereof. Tread members which are manufactured in accordance with this method can be further prepared and processed or built-up as usual for one-piece tread members.

According to a further inventive method for manufacturing pneumatic vehicle tires, portions of the side walls are added to the tread member in one operational step by, for example, press-rolling, extruding or the like, the carcass and the belt are prepared, and thereafter the tread member and the side walls are built-up or applied to the carcass.

According to an additional specific method of manufacturing pneumatic vehicle tires all the rubber layers enveloping the carcass are simultaneously extruded in one extrusion operation inclusive of corresponding preforming operations and are subsequently applied to or built-up upon the preformed carcass.

The two last-mentioned methods enable a new method for the production of pneumatic vehicle tires and are associated with large savings of time as compared to conventional methods and, additionally, enable the largest possible automation of the preparation or tire build-up operation.

Continuing further, it is also here noted that the invention is not only concerned with the aforementioned tire structure and method aspects, but also relates to a novel construction of apparatus for manufacturing the tires. Generally speaking, the inventive apparatus is intended for the production of a tread member of a pneumatic vehicle tire including a radial ply carcass, two side walls each lining a lateral region of the carcass, a tread member covering an apex or crown region of the carcass and composed of a base layer formed of a mixture and positioned closer to the carcass axis and a cap layer accommodated in a trough defined by shoulders and formed on the top side of the base layer, and a belt containing at least one rubberized cord ply embedded between the tread member and the apex or crown region of the carcass.

To achieve the aforementioned measures the inventive apparatus for producing a tread member of a pneumatic vehicle tire, in its more specific aspects, comprises:

at least two screw or worm extruders opening into an extrusion head and a preforming ledge of any desired or random design by means of which in combination with the extrusion nozzle there can be obtained any desired doubling contour.

Advantageously, such apparatus enables the manufacture of the entire tread member in one-piece conjointly from the mixtures forming the base layer and the cap layer.

According to a further novel method for manufacturing pneumatic vehicle tires, it is of advantage, for different reasons, to separately produce the mixture forming the base layer and the mixture forming the cap layer, to form the trough shoulders of the trough so as to be recessed or inset on the side associated with the cap layer, and to subsequently join the cap layer to the base layer by inserting the same into the base layer. The advantages of such method will especially be felt in all those tire manufacturing operations in which the most different raw members of the tires have to be produced each using a respective extruder.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components, and wherein.

DETAILED DESCRIPTION OF THE PREFERRED EMBODIMENTS

Describing now the drawings, it is to be understood that only enough of the construction of the pneumatic vehicle tires and the extrusion apparatus for producing the same has been shown as needed for those skilled in the art to readily understand the underlying principles and concepts of the present development, while simplifying the showing of the drawings.

Figure 1:
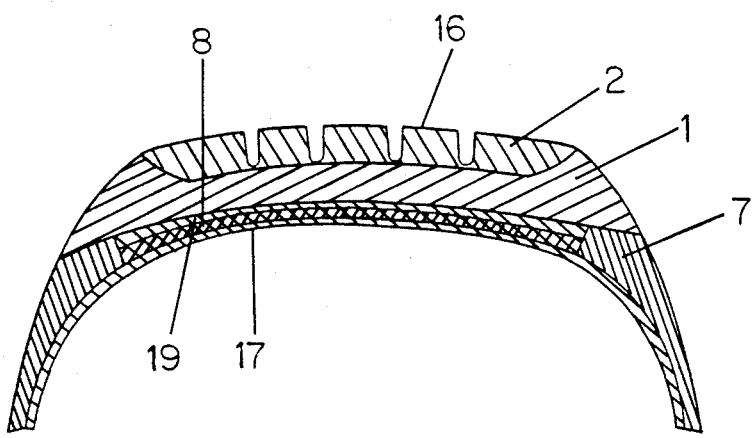
FIG. 1 shows a cross-section through the radially outer part of a first embodiment of pneumatic vehicle tire according to the invention.

Turning attention now specifically to FIG. 1, which exemplifies the inventive principles, there has been illustrated in cross-section the radial outer part of a first exemplary embodiment of pneumatic vehicle tire according to the invention including a carcass 17. Side walls 7 are arranged laterally at the carcass 17, while the radially outer region of the carcass 17 is covered by at least two belt layers or plies 8, 19. A tread member 16 is arranged on top of the belt layers or plies 8, 19. The tread member 16 comprises a doubled tread structure composed of a base layer or ply 1 and a profiled cap layer or ply 2. According to the invention, the base layer or ply 1 is of a trough-shape, so that the same laterally and partially encases the cap layer or ply 2 which forms the roadway-contacting portion of the tread member 16. It will be clearly evident from the drawing of FIG. 1 that the mixture forming the base layer 1 forms the greatest possible volume proportion of the tread member 16, whereby the chemical-physical properties of the mixture forming the base layer or ply 1 most strongly affect the driving properties of the pneumatic vehicle tire.

Figure 2:
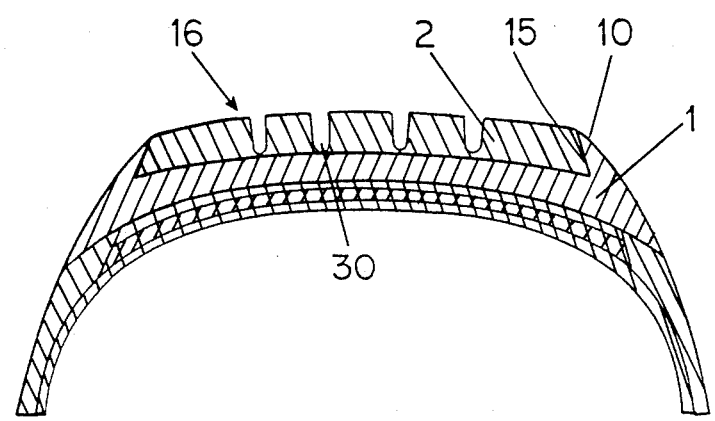
FIG. 2 shows a cross-section through the radially outer part of a second embodiment of pneumatic vehicle tire according to the invention.

In the second embodiment of the pneumatic vehicle tire as shown in FIG. 2 of the drawings, the tread member 16 comprises a base layer or ply 1, the trough shoulders 10 of which are arranged and designed to recess or retract inwardly from the side 15 which is associated with the cap layer 2. By such a design there is achieved the result that the base layer or ply 1 and the cap layer or ply 2 constituting the roadway-contacting portion of the tread member 16 can be separately manufactured and later bonded to each other in a further manipulation by a snap-like combination or attachment of the two members. However, it is also possible to select any other cross-section for the base layer or ply 1 which is of advantage with respect to the manufacturing process. For example, the trough 30 may also be designed in such a way as to widen towards the exterior.

Figure 3:
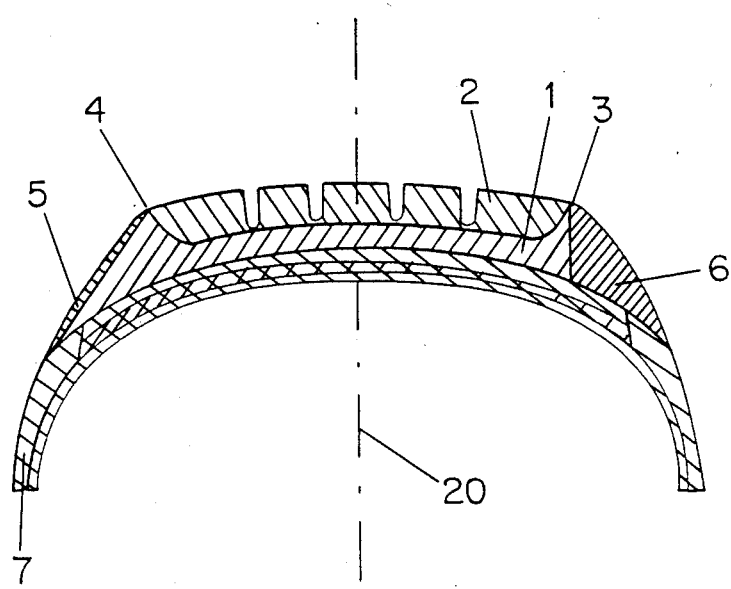
FIG. 3 shows a cross-section through the radial outer part of a third embodiment of pneumatic vehicle tire according to the invention, the left-hand half and the right-hand half of the figure showing different designs of a two-membered or bipartite base layer in the tire.

FIG. 3 of the drawings shows a third embodiment of the pneumatic vehicle tire according to the invention having a multi-membered base layer or ply 1, in particular a two-membered or bipartite base layer 1. The subdivision has been performed in the region of the trough shoulders 3 and 4. In the design shown in the left-hand half of FIG. 3, the part 5 of the base layer 1 which is most distant or remote from the circumferential equatorial plane 20 is composed of the same rubber mixture as the side wall 7. On the right-hand side of FIG. 3 there is also shown a design including a two-membered or bipartite base layer 1 with a subdivision in the region of the trough shoulder 3 and of which at this side a greater proportion or part 6 is made of a different rubber mixture. For reasons of production techniques, however, the proportion or part 6 may also be composed of the same rubber mixture as the main portion of the base layer or ply 1. Here also in both instances the cap layer or ply 2 constitutes the roadway-contacting portion of the tread member.

Figure 4:
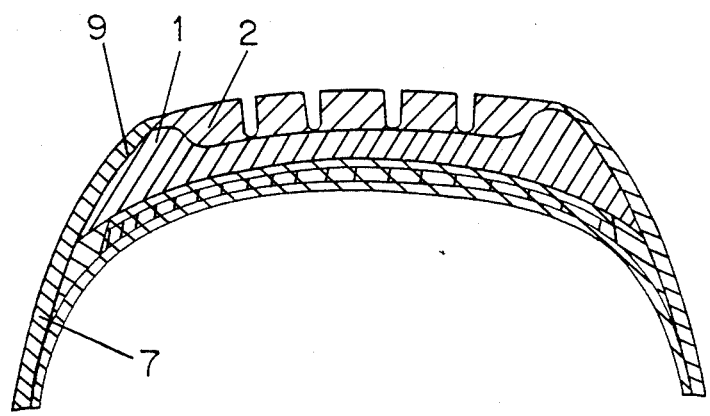
FIG. 4 shows a cross-section through a radially outer part of a fourth embodiment of pneumatic vehicle tire according to the invention.

In the fourth embodiment of the pneumatic vehicle tire as shown in FIG. 4 no portion of the contour line 9 of the base layer or ply 1 contacts the surface of the tire. Here those portions of the base layer or ply 1 which are not covered by the cap layer or ply 2, constituting the roadway-contacting portion of the tread member, are overlapped by the tire side walls 7.

Figure 5:
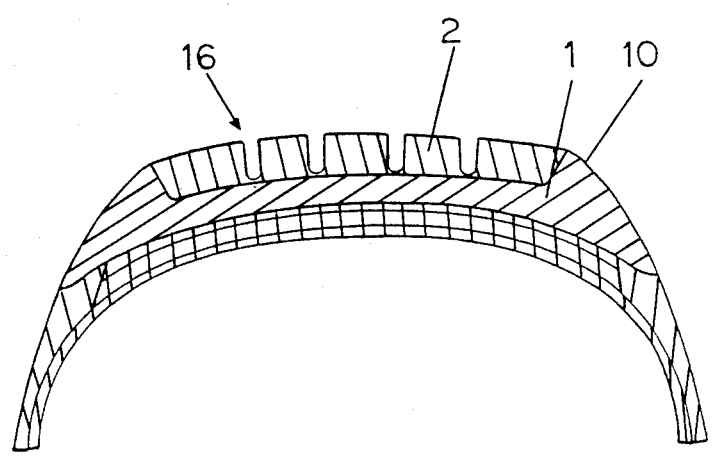
FIG. 5 shows a cross-section through a radially outer part of a fifth embodiment of pneumatic vehicle tire according to the invention.

FIG. 5 shows a fifth embodiment of the pneumatic vehicle tire according to the invention in which the tread member 16 comprises a cap layer or ply 2, again constituting the roadway-contacting portion of the tread member, and a base layer or ply 1, the trough shoulders 10 of which form the shoulders of the tire. In this structure the base layer or ply 1 is composed of a particular anti-skid caoutchouc or rubber mixture, whereby an exceptional anti-skid behavior results in curves. The base layer or ply 1 forming the trough shoulders 10 may also consist of a specifically wear-resistant caoutchouc or rubber mixture.

It can be here stated that it is possible within the teachings and scope of the invention to select for each of the herein disclosed tire constructions the thickness of the base layer or ply 1 such that the same never comes into contact with the roadway during the lifetime of the tire. This implies, that the tire is driven exclusively on the cap layer or ply 2, which solely constitutes the roadway-contacting portion of the tread member, until the legally permitted minimum profile depth is reached. Alternatively, the thickness of the base layer or ply 1 in its relation to the cap layer or ply 2 can be selected such that the same contacts the roadway after a given mileage. It will be self-evident that in the latter case the mixture forming the base layer or ply 1 will have to possess appropriate tread properties like, for example, dry and wet traction, wear and so forth.

Figure 6:
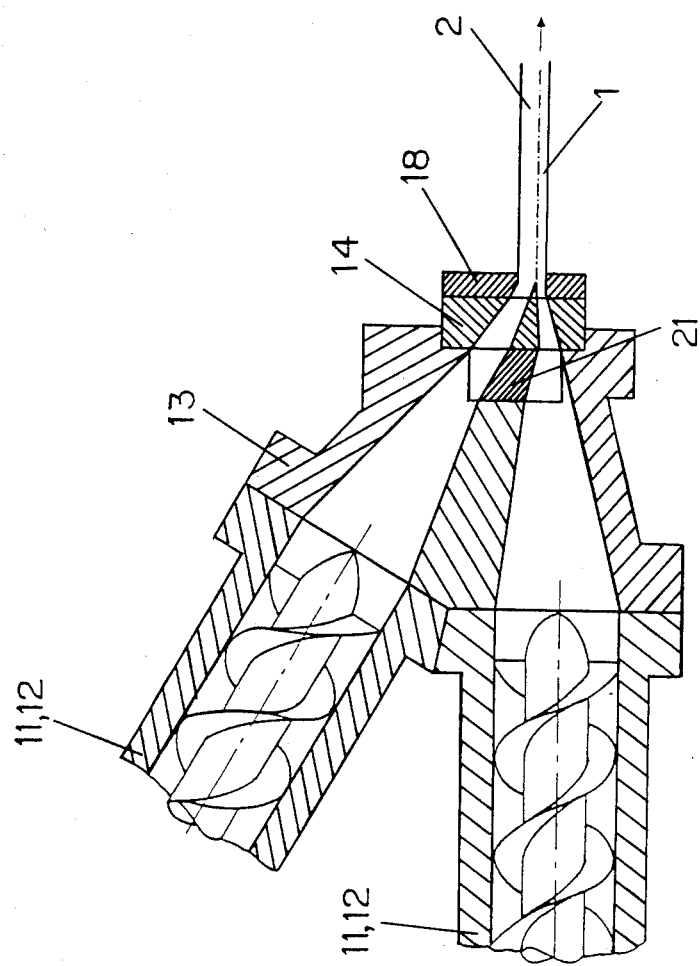
FIG. 6 is a schematic illustration of an extrusion apparatus according to the invention for producing the pneumatic vehicle tires as shown in FIGS. 1 to 5.

In the drawing of FIG. 6 there is schematically shown in section an exemplary embodiment of apparatus according to the invention for manufacturing pneumatic vehicle tires as described hereinbefore with reference to FIGS. 1 to 5 of the drawings. The apparatus comprises two extruders 11, 12 which operate on a common extrusion head 13. By means of the two extruders 11, 12 the mixtures forming the base layer or ply 1 and the cap layer or ply 2 are simultaneously extruded. The extrusion head 13 is provided with inserts 21 which can be exchanged, if desired. A preforming ledge 14 is provided and, after preforming in the extrusion head 13, the two rubber mixtures are bonded to each other in a still pasty or tacky state using the preforming ledge 14 in conjunction with the extrusion nozzle 18.

While there are shown and described present preferred embodiments of the invention, it is to be distinctly understood that the invention is not limited thereto, but may be otherwise variously embodied and practiced within the scope of the following claims.

What I claim is:

1. A pneumatic tire comprising:
    a radial ply carcass defining lateral regions, two shoulder regions, a crown region and a tire axis defining the axis of rotation of the tire;
    two side walls each covering a respective one of said lateral regions of said radial ply carcass;
    a tread member covering said crown region of said carcass and defining a roadway-contacting portion;
    said tread member comprising a base layer positioned closer to said tire axis defining the axis of rotation of the tire and a cap layer arranged on top of said base layer;

said cap layer being profiled and solely constituting said roadway-contacting portion of the tread member during normal tire operation;

said base layer forming a trough accommodating said cap layer and at least partially encasing the cap layer;

said trough being bounded by two trough shoulders each one of which bounds a related one of said two shoulder regions of the tire adjacent the cap layer;

said trough shoulders formed by said base layer separating said cap layer form the shoulder regions of the tire;

said base layer being formed of a predetermined caoutchouc mixture;

said tire shoulder regions being formed by said predetermined caoutchouc mixture forming said base layer; and a belt comprising at least one rubberized cord play embedded between said tread member and said crown region of said carcass.

2. The pneumatic vehicle tire as defined in claim 1, wherein:

said tread member defines a total cross-section; and said base layer defines a cross-section, the proportion of which in relation to said total cross-section amounts to at least 30 percent.

3. The pneumatic vehicle tire as defined in claim 2, wherein:

said proportion of said base layer in relation to said total cross-section amounts to at least 40 percent.

4. The pneumatic vehicle tire as defined in claim 1, wherein:

said base layer defines said trough shoulders; and said trough shoulders are constituted by a plurality of members in order to improve the rolling properties of the tire in the region of said trough shoulders.

5. The pneumatic vehicle tire as defined in claim 4, wherein:

said trough shoulders are constituted by two members defining said plurality of members.

6. The pneumatic vehicle tire as defined in claim 1, wherein:

said base layer comprises a rubber mixture having a Shore A hardness in a range of 60 to 80 and a $\sigma$ 150 stress value in a range of 4 to 9 MPa;

said cap layer comprises a relatively soft rubber mixture having a Shore A hardness in a range of 55 to 75 and a $\sigma$ 150 stress value in the range of 2 to 5 MPa; and the Shore A hardness of said base layer rubber mixture being greater by at least 3 units than that of said cap layer rubber mixture.

7. The pneumatic vehicle tire as defined in claim 1, wherein:

said base layer comprises a rubber mixture having a Shore A hardness in a range of 50 to 70;

said cap layer comprises a relatively harder rubber mixture having a Shore A hardness in a range of 60 to 80; and the Shore A hardness of said cap layer rubber mixture being greater by at least 3 units than that of said base layer rubber mixture.

8. The pneumatic vehicle tire as defined in claim 1, wherein:

said base layer has a tangent $\delta$ value smaller than 0.1 at a tempertaure of 100° C.;

said cap layer has a tangent $\delta$ value greater than 0.1; and said tangent $\delta$ value being defined as the ratio of loss modulus over storage modulus.

9. The pneumatic vehicle tire as defined in claim 8, wherein:

said base layer has a tangent $\delta$ value in the range of 0.03 to 0.08 at a temperature of 100° C.; and said cap layer has a tangent $\delta$ value in the range of 0.14 to 0.20 at a temperature of 100° C.

10. The pneumatic vehicle tire as defined in claim 1, wherein:

said base layer basically contains main constituents which are essentially the same as main constituents of said cap layer; and said base layer is devoid of any grip-improving polymers and tread-specific aging protective agents usually present in the cap layer.

11. The pneumatic vehicle tire as defined in claim 1, wherein:

said base layer basically contains main constituents which are essentially the same as main constituents of said cap layer; and said base layer containing a higher amount of reclaimed raw materials.

12. The pneumatic vehicle tire as defined in claim 11, wherein:

said reclaimed raw materials comprise tire reclaims.

13. The pneumatic vehicle tire as defined in claim 11, wherein:

said base layer containing said higher amount of reclaimed raw materials, has a Shore A hardness and a $\delta$ 150 stress value which are greater than the Shore A hardness and the $\delta$ 150 stress value of said cap layer.

14. The pneumatic vehicle tire as defined in claim 1, wherein:

said belt comprises a cord-embedding mixture; and said predetermined caoutchouc mixture forming said base layer being formed by a caoutchouc mixture composed of the same constituents as said cord-embedding mixture.

15. The pneumatic vehicle tire as defined in claim 1, wherein:

said belt comprises a belt-press-on mixture;

said predetermined caoutchouc mixture forming said base layer being formed by a caoutchouc mixture composed of the same main constituents as said belt press-on mixture; and said predetermined caoutchouc mixture forming said base layer being devoid of any adhesive system for improving the adhesion to said cord ply.

16. The pneumatic vehicle tire as defined in claim 1, wherein:

said predetermined caoutchouc mixture forming said base layer and a caoutchouc mixture forming said cap layer are each formed of a highly elastic, antiskid caoutchouc mixture; and said predetermined caoutchouc mixture forming said base layer having admixed thereto production reclaims from tread manufacture.

17. The pneumatic vehicle tire as defined in claim 1, wherein:

said base layer requires a penetration energy of at least 90 mJ; and said penetration energy of said base layer is higher by at least 10% than the penetration energy of said cap layer.

18. The pneumatic vehicle tire as defined in claim 1, further including:
 a caoutchouc mixture forming said side walls; and
 said predetermined caoutchouc mixture forming said base layer comprising essentially the same constituents as said caoutchouc mixture forming said side walls.

19. The pneumatic vehicle tire as defined in claim 18, wherein:
 said predetermined caoutchouc mixture forming said base layer devoid of any side wall-specific mixture additives such as agents for improving tear resistance and stabilizers towards ozone.

20. The pneumatic vehicle tire as defined in claim 1, wherein:
 said predetermined caoutchouc mixture forming said base layer and a caoutchouc mixture forming said cap layer being composed of different rubber compositions in order to improve the rolling properties of the tire specifically in said two shoulder regions.

* * * * *

UNITED STATES PATENT AND TRADEMARK OFFICE
CERTIFICATE OF CORRECTION

PATENT NO. : 4,739,811
DATED : April 26, 1988
INVENTOR(S) : ALFRED RAMPL

It is certified that error appears in the above-identified patent and that said Letters Patent is hereby corrected as shown below:

Column 11, line 13, after "layer" please delete "form" and insert --from--

Column 12, line 33, please delete "$\delta$" (delta) and insert "$\sigma$" (sigma)

Column 12, line 34, please delete "$\delta$" (delta) and insert "$\sigma$" (sigma)

Signed and Sealed this

Thirteenth Day of September, 1988

*Attest:*

DONALD J. QUIGG

*Attesting Officer*     *Commissioner of Patents and Trademarks*